United States Patent
Wilson

(10) Patent No.: US 7,581,176 B2
(45) Date of Patent: Aug. 25, 2009

(54) DOCUMENT DISPLAY SYSTEM AND METHOD

(75) Inventor: Eric Wilson, Sunbury (AU)

(73) Assignee: Eric Cameron Wilson, Taylors Lakes, Victoria (AU)

( * ) Notice: Subject to any disclaimer, the term of this patent is extended or adjusted under 35 U.S.C. 154(b) by 316 days.

(21) Appl. No.: 10/499,687

(22) PCT Filed: Dec. 19, 2002

(86) PCT No.: PCT/AU02/01727

§ 371 (c)(1),
(2), (4) Date: Jun. 18, 2004

(87) PCT Pub. No.: WO03/052582

PCT Pub. Date: Jun. 26, 2003

(65) Prior Publication Data

US 2005/0097458 A1    May 5, 2005

(30) Foreign Application Priority Data

Dec. 19, 2001 (AU) .................................. PR9620

(51) Int. Cl.
*G06F 17/00* (2006.01)
(52) U.S. Cl. .................... 715/243; 715/273; 715/252
(58) Field of Classification Search ................. 715/517, 715/526, 523, 521, 273, 243, 244, 247, 249, 715/251, 252
See application file for complete search history.

(56) References Cited

U.S. PATENT DOCUMENTS

| | | | | |
|---|---|---|---|---|
| 5,231,579 A * | 7/1993 | Tsuchiya et al. | ............ | 715/508 |
| 5,801,691 A * | 9/1998 | Dahl | ........................... | 715/746 |
| 5,818,446 A | 10/1998 | Bertram | | |
| 5,956,737 A * | 9/1999 | King et al. | ................... | 715/517 |
| 6,175,845 B1 | 1/2001 | Smith | | |
| 6,199,082 B1 * | 3/2001 | Ferrel et al. | .................. | 715/522 |
| 6,311,180 B1 * | 10/2001 | Fogarty | ......................... | 707/4 |
| 6,389,437 B2 * | 5/2002 | Stoub | .......................... | 715/523 |
| 6,557,017 B1 * | 4/2003 | Venable | ....................... | 715/502 |
| 6,587,132 B1 * | 7/2003 | Smethers | ..................... | 715/858 |
| 6,626,958 B1 * | 9/2003 | McCauley et al. | ........... | 715/517 |
| 6,788,946 B2 * | 9/2004 | Winchell et al. | ............. | 455/459 |
| 2001/0011364 A1 | 8/2001 | Stoub | | |
| 2001/0056460 A1 * | 12/2001 | Sahota et al. | ................ | 709/201 |
| 2003/0072486 A1 * | 4/2003 | Loui et al. | ................... | 382/175 |
| 2003/0196169 A1 * | 10/2003 | Wittkotter et al. | ............ | 715/513 |
| 2004/0205602 A1 * | 10/2004 | Croeni | ........................ | 715/517 |

OTHER PUBLICATIONS

Freire, Juliana, et al, "WebViews: Accessing Personalized Web Content and Services", Proceedings of the 10th International Conference on World Wide Web, Apr. 2001, pp. 576-586.*

* cited by examiner

*Primary Examiner*—Laurie Ries

(57) ABSTRACT

A document presentation system is disclosed. The document presentation system includes a rendering unit that can analyse user or publisher preferences to determine content layout and navigation by examining the dimensions of the available viewing area to determine a suitable document layout and navigation system, a formatting unit that resizes and rearranges content according to the content layout and navigation determined by the rendering unit, a display unit that presents content to a user and responds to user interaction, and a cache unit that stores reformatted content for display by the display unit.

56 Claims, 8 Drawing Sheets

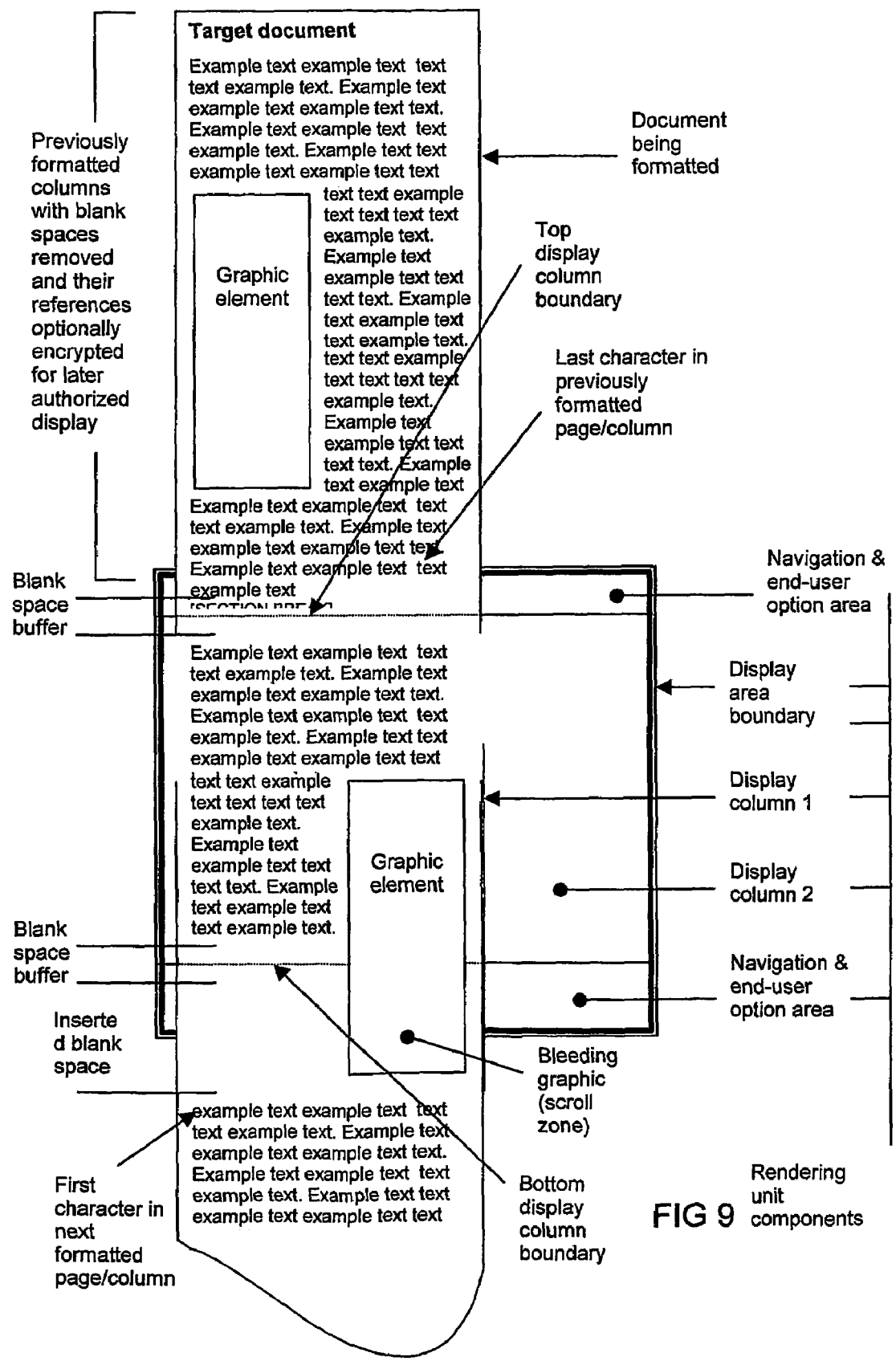

DOCUMENT DISPLAY SYSTEM AND METHOD

This invention relates to a system and method for reformatting documents for display on varying display types.

In particular, it relates to a presentation system that performs rendering and reformatting of documents including imaging and navigation.

BACKGROUND TO THE INVENTION

From the very earliest days of computing, programmers have been forced to target applications to particular screen sizes and resolutions. Even the flexibility of the Web's HTML imposes these kinds of limits, with some pages looking good on some resolutions while having a poor appearance on others.

This situation was awkward yet manageable, while most of the world's information displays were confined to fixed computer monitors and televisions, most with industry-standard sizes and resolutions. But now, with the introduction of lightweight, low power consumption displays with wide size variation, such as liquid crystal displays and plasma units, the former display constraints are being removed. Nowadays programmers and content creators cannot make assumptions about the devices that will display the delivered information. To do so introduces inherent weaknesses in the way their content can be accessed and linked with other information.

Generally speaking, the IT industry has reacted to this challenge using traditional notions of 'device independence'. The seminal model of this approach to content presentation is Adobe's Page Description Format (PDF). This digital file type uses similar formatting commands across a multitude of devices, thus ensuring the correct display of documents on whatever system is used to render the output to the user. This ensures the information looks the same whatever resolution it displays on, with detail being degraded on less sophisticated rendering devices. However this detail is not lost if viewed on a low resolution monitor, as the user can often zoom in if desired.

Although this method preserves the original fidelity of the information's look and feel, PDF files are static, typically being rendered to a pre-determined paper size. The end-user's device is expected to navigate around this. This can be difficult, particularly if the original document was rendered to a size much larger than the end-user's device, such as trying to look at a Foolscap page on a cell phone sized display. Intrinsic to this method of information distribution is the expense of converting documents from their original form to the description language of PDF. Such conversions can limit a document's reuse, with recipients experiencing difficulty re-editing and thus reusing the information in a similar form in different contexts.

The problem is exacerbated in Web pages where formatting is mixed up with the substance of content. It is not always easy to determine whether content is a bitmap picture, a textural heading bitmap, a navigational token bitmap or all or only some of the above. It is also difficult to determine whether a table is a logical unit of information or a layout separator. The ambiguity of display formats often compromises the ability of display devices to render the information in a way that suits the end-user environment. So file formats such as PDF and HTML often result in compromised viewing situations when rendered by devices not originally targeted by a document creator. This is becoming increasingly unmanageable in today's world of device proliferation, where advances in battery, communications and flat display technology are multiplying end user display options.

To overcome these deficiencies, many in the IT industry propose a different kind of device-independent format. Using standards such as XML, information presentations as diverse as text, pictures and program user interfaces are being described in a manner whereby the substance of the content is stored separately from its layout or display formatting instructions. This provides the display device with the opportunity to make value judgments on how content should be displayed, both in the context of its use and the display environment in which it is to be rendered.

While this may be a great step forward in solving technical issues it results in content creators, publishers and developers losing control of how information is to be displayed. This is unacceptable because the look and feel of documents and programs is an essential ingredient for product differentiation. Moreover, content is often deliberately presented by its creator in such a way as to give more or less significance to its various parts. So altering the look and feel of content for convenient display might also change its intended meaning.

Of even greater concern is the arbitrary degradation of information that each end-user device may impose when rendering information on low resolution systems. The look and feel of the document, including the layout and navigation, is sometimes completely different from what is rendered on higher resolution displays. This forces users to learn a different way of using an application or document on each class of device displaying the information.

So while abstracting content away from its format is technically possible, in practice formatting and layout provides a context which gives meaning to content. This has been addressed in part by employing templates, which when applied alter XML documents to be more suited to their intended display environments. This offers some improvement compared to static formats such as PDF or HTML. Individual document conversion and hard coding can be abolished, being handled once for each device and each document class or application type using a complex matrix of templates.

However using device and document templates with XML cannot eliminate all of the rendering disadvantages due to multiple display sizes. The use of templates assumes developers and content creators can know in advance all the device types that will try to render their information. And having no control over these devices makes content degradation and user interface variation inevitable. This is caused by differences in capabilities between devices, as mandated by their size, capacity of their power source and indented use, creating learning curves to effectively present the same content across multiple device types. Altering XML documents with templates this way may also compromise their reusability when passed to other rendering engines or editors on more advanced systems.

Another problem that is not addressed by either flexible XML or fixed description formats is the formatting issues associated with document readability over different viewing distances. For example, a billboard sized screen may have four million pixels. A hand-held device may have the same. One user's eyes are 30 centimeters away; another's are 30 meters away. But even when two users look at the same device from the same distance, different magnifications of the content may be appropriate, depending on the quality of their eyesight. This is a key usability flaw in all device-centric formatting regimes, be they fixed or flexible.

The problems above are further compounded by modern end-users being connected through networks such as the Internet. In times past, most users accessed information from one or at the most two devices—their desktop or notebook PC. But in a world of inter-connected devices, users may soon expect to be able to read documents located on their PC or business servers on any handheld device via a wireless link, for example a mobile phone. Therefore these problems are being encountered by users sharing documents, as well as where a reader and author are the same person.

The range of possible display sizes information must be accessible through is further being proliferated through portal technology. Portals assemble information on behalf of end-users, typically presenting it on Web pages made up of a series of 'info-boxes'. Even info boxes displaying the same information may vary in size, depending on how important each end-user considers the contained information to be. Therefore the arbitrary nature of portal information viewing areas means maintaining a consistent look and feel to content is becoming even harder to achieve.

What is lacking is a presentation system which strikes a balance between the competing interests of end-user preferences, document owner/creator desires, rendering device constraints and network transmission considerations. This must be achieved in such a way as to preserve the content's look and feel, navigability, usability and reuse, with high fidelity across a multitude of devices.

Prior patent documents have been identified that relate to the reformatting of documents. Reference may be had to U.S. Patent Application No. 2001-0011364, in the name of Stroub. Stroub reformats documents into columns that have a fixed number of characters per line. The number of columns is selected to suit a given screen. The approach of Stroub is useful for simple text but is of limited value for more complex content.

Another approach is described in U.S. Pat. No. 6,175,845 in the name of IBM Corp. The IBM approach is to implement navigation between parts of a document by inferring the significance of content to users. Not having a unique multi-user, multi resolution, multi-magnification cache, the system reformats content each time it is requested by the user or when the user resizes the viewing area. However content-based analysis and per-view reformatting on demand are particularly processor intensive mechanisms for the display of content. As a result, this method is impractical for most applications.

In U.S. Pat. No. 5,818,446 IBM Corp also describes a system for changing user interfaces, principally document navigation, again based on analyzing the information being displayed. Using display software to change the user interface according to certain criteria which is compared against the characteristics of the content on hand has some glaring limitations. The method doesn't deal with critical factors influencing usability such as display area size and requires end-users to learn multiple interfaces to view content on the same device.

The prior art does not describe a system or method which reformats documents for display on varying display types while minimizing repeat processing and optimizing display for optional transmission over a computer network.

OBJECT OF THE INVENTION

It is an object of the present invention to provide a system and method for reformatting documents for display on varying display types.

It is a further object to minimize repeat processing and optimize display for optional transmission over a computer network.

Further objects will be evident from the following description.

DISCLOSURE OF THE INVENTION

In one form, although it need not be the only or indeed the broadest form, the invention resides in a document presentation system comprising:
a rendering unit that analyses user or publisher preferences to determine content layout and navigation;
a formatting unit that resizes and rearranges content according to the content layout and navigation determined by the rendering unit;
a display unit that presents content to a user and responds to user interaction; and
a cache unit that stores reformatted content for display by the display unit.

The rendering unit may further establish device characteristics such as the presence or absence of external buttons, joysticks or speech recognition, altering the on-screen navigational features accordingly. Alternately, for simplicity or to maximize the content viewing area, devices relying on such external navigation may mandate that no on-screen navigation features be made available to end-users, except perhaps within the content itself, such as hyperlinks. In this case, the rendering unit might simply provide the formatting unit with the boundaries into which content is to be reformatted.

The formatting unit may further perform content manipulation including one or more of blank space reduction, blank space insertion, text condensing, margin adjustment, and tab stop adjustment.

The display unit may also incorporate processes for detecting system misuse, such as attempted unauthorized access and have functions to monitor the efficiency of reformatting and content display. These may offer end-users various alternatives should an error occur, including using information stored in a management or stakeholder subsystem (such as that described in our co-pending international application titled "A System for Secure Distribution of Electronic Content and Collection of Fees) to help appropriately restore the user's display. Additionally, the display is also responsive to pre-defined 'copy-zones', whereby users can be otherwise prohibited from selecting and copying content to their clipboard.

In a further form, the invention resides in a method of reformatting content for display on a display device including the steps of:
retrieving content from a repository;
determining characteristics of a display device that is to display the content, including the area (such as the number and dimensions of pixels) available for display of the content and any associated control structures on the display;
rendering content areas and any associated control structures to suit the display characteristics; and
reformatting content for display of the content in the available content areas, said reformatting including resizing and rearranging.

Suitably the reformatting includes:
identifying wrapping graphic elements and repositioning said graphic elements to avoid wrapping;
identifying section breaks and inserting blank space to push content to a next column; and
identifying bleeding graphic elements and repositioning said graphic elements to avoid bleeding.

The invention may have particular application to the presentation subsystem described in our co-pending application titled, "A System for Secure Distribution of Electronic Content and Collection of Fees", which is incorporated herein by reference.

BRIEF DESCRIPTION OF THE DRAWINGS

To assist in understanding the invention, preferred embodiments will be described with reference to the following figures in which:

FIG. 9 shows the elements of a reformatted document.

DETAILED DESCRIPTION OF THE DRAWINGS

Figure 1:
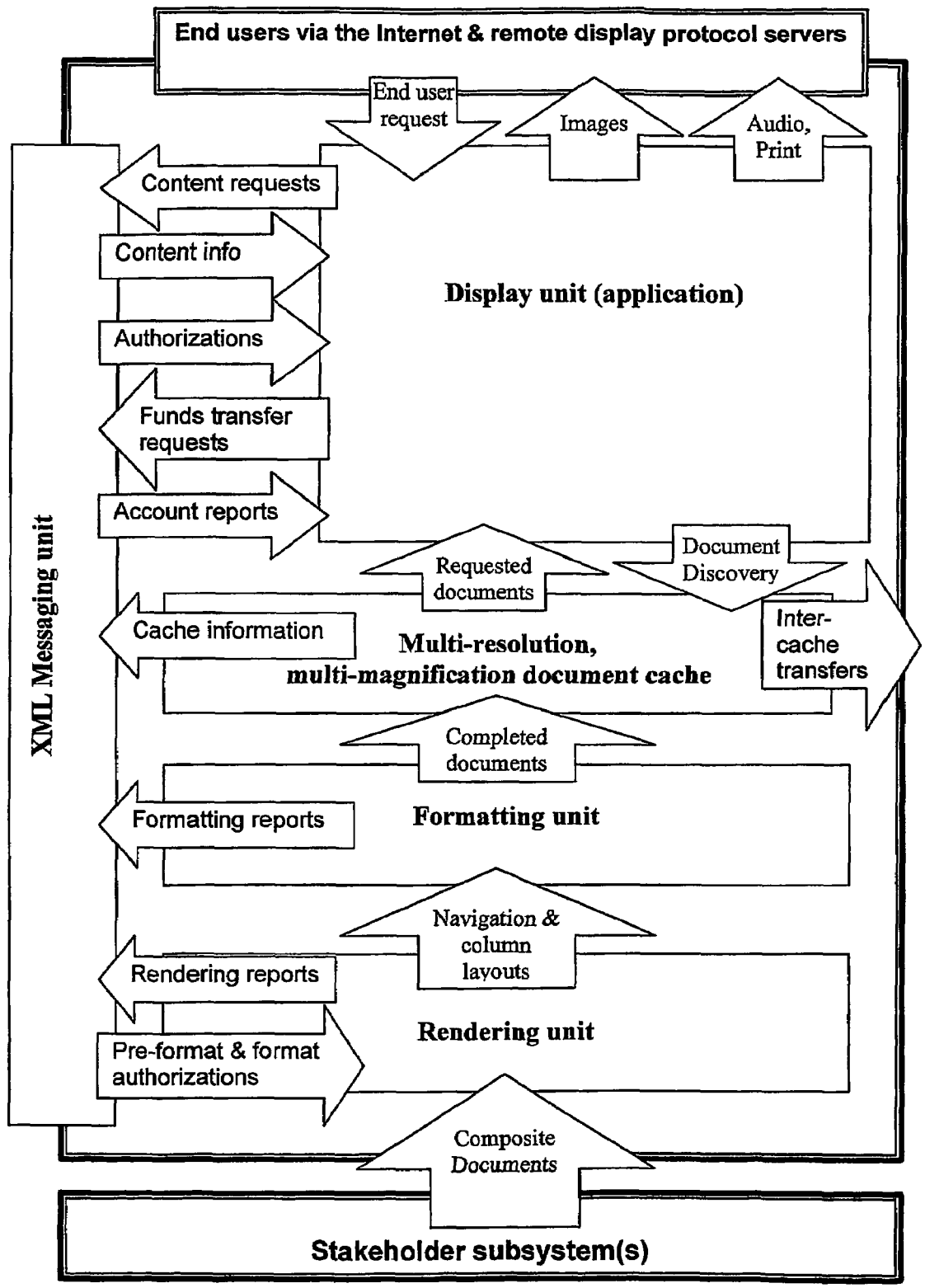
FIG. 1 shows an overview of a presentation system.

Referring to FIG. 1, there is shown a schematic of a presentation system in an application context. Content is provided to the system from, for example, a stakeholder subsystem (like that in our co-pending application mentioned above) that allows preparation of composite documents containing one or more of text, images, applets, scripts and other material. The stakeholder subsystem will normally also store a master copy of the document.

The composite document is passed to the presentation system that consists of a number of units including a rendering unit, formatting unit, cache and display unit. The presentation system presents a reformatted version of the document to an end user for local display or to a display server connected over a computer network to the end-user's display device via remote display protocols.

Communication with other subsystems may be effected by XML or other messaging, as described in our co-pending application.

As depicted in FIG. 1, the composite document is converted to a basic frame structure based on information obtained about the users display. Navigation and layout elements, such as arrows, page and column links, etc are added within the available display space. The rendered document is then reformatted to suit the display by rearranging text, graphics, and other elements to satisfy viewing preferences defined by the originator and/or the user, taking into account the characteristics of the display device.

The document is stored in a cache for future use in a location which may also identify the display characteristics of the stored document. This leads to a novel document retrieval process as described in greater detail below. A copy of the reformatted document retrieved from cache is displayed to the user.

The Presentation system operates in four stages. It consists of four units, for display, cache, formatting and rendering of documents:

The Display Unit is responsible for maintaining the end user interaction and imaging documents for local display or network transmission using remote display protocols. The display unit also incorporates a number of features to detect misuse of the system.

The multi-resolution, multi-magnification document caches feed documents to the display unit from the cache. This minimizes the need for processing by reusing previously formatted content. If a document is not available in the cache to suit the combination of the end-user's device, magnification or other publisher or end user preferences, an attempt may be made (by either the cache or display unit) to find an appropriately reformatted document in another cache. If one cannot be found, the formatting and rendering units are activated to provide one.

The formatting units minimize the need for end users to scroll though documents by dividing them into smaller, more manageable sections. These reformatted documents may or may not fit completely on the screen, depending on how the content has been marked up, the device size, how the content or it's images are being viewed, and publisher and end-user preferences. The reformatting process resizes and moves content to an appropriate size, as well as employing various 'blank space' reduction and insertion techniques. These include condensing text, reducing tab stops, adjusting margins etc. The basic layout of the document (such as the number of columns) in which this is done is predetermined by a rendering unit.

The rendering units examine the dimensions of the available viewing area, and analyses end-user and publisher preferences to determine a suitable document layout and navigation system. This basic layout is then used by the formatting unit to measure and manipulate content.

The rendering unit may fill the entire available display area or render in dimensions or magnifications which are a near match to an end user's or publisher's preference or display device characteristics. Likewise the display unit can also request documents from the Cache which are a near match to its available display area or desired magnification. Using existing reformatted content nearly matching the display area size or desired magnification can speed up document access for end users and increase computing efficiency by reducing the need for repeat reformatting. The system if required, can determine the next near match incrementally, such as providing the largest rendering dimensions fitting the display, when made available in fifty-pixel x and y axis or at 20% magnification level increments. A Cache unit may offer a display unit such an available near match if it cannot yet fulfill the exact request. Or end users may be given the choice between a near match and a document exactly fitting their display device and viewing preferences. A near match may also be offered to an end-user for example, while a large document takes time to be reformatted nearer or in accordance with their exact specification.

Information pertaining to end-user interactions, such as document navigation, may be encrypted. This prevents unauthorized display units or external viewers from improperly accessing content. Documents may also be password protected to prevent opening by unauthorized display units or viewers.

Figure 2:
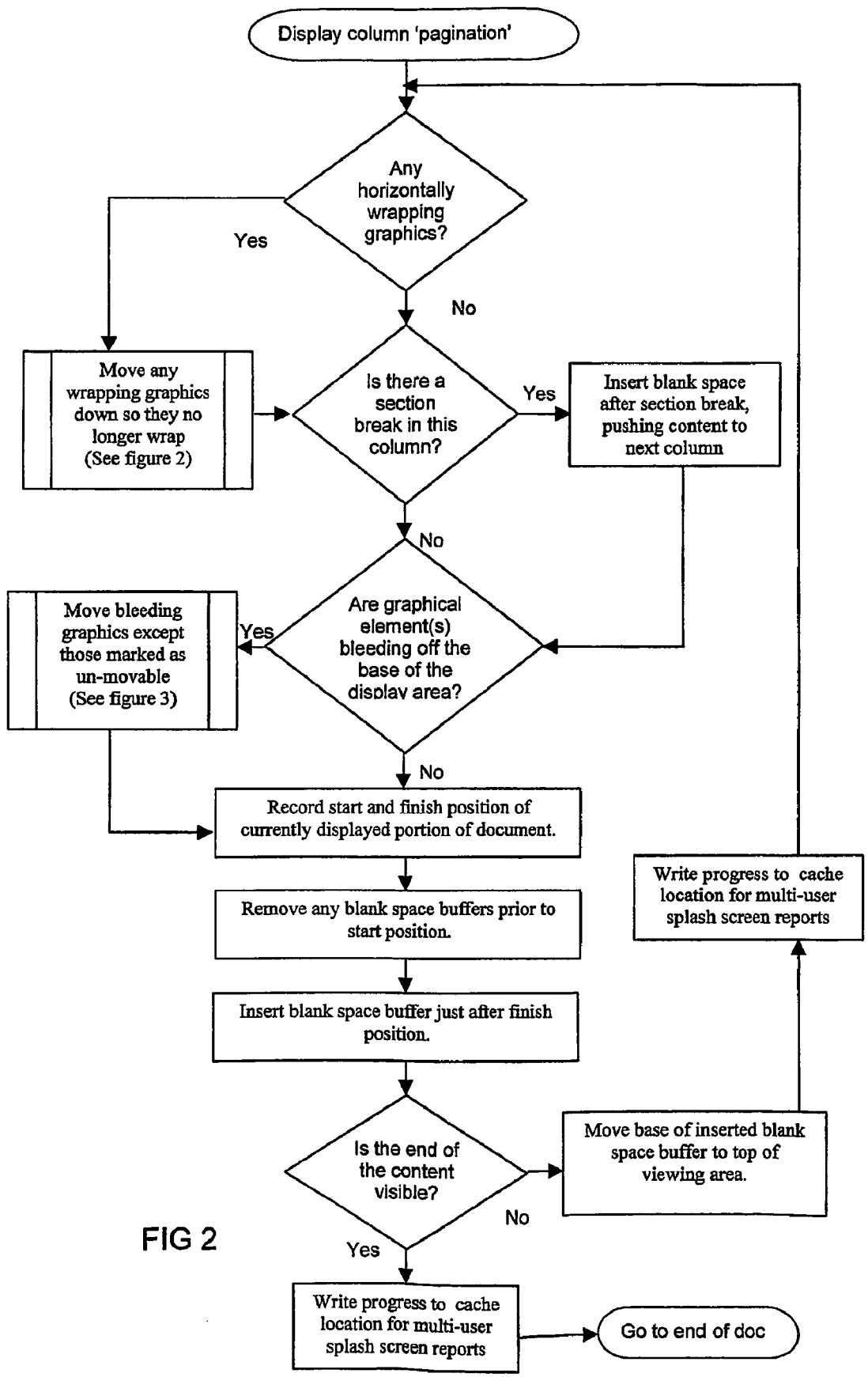
FIG. 2 is a flowchart showing pagination steps.
Figure 3:
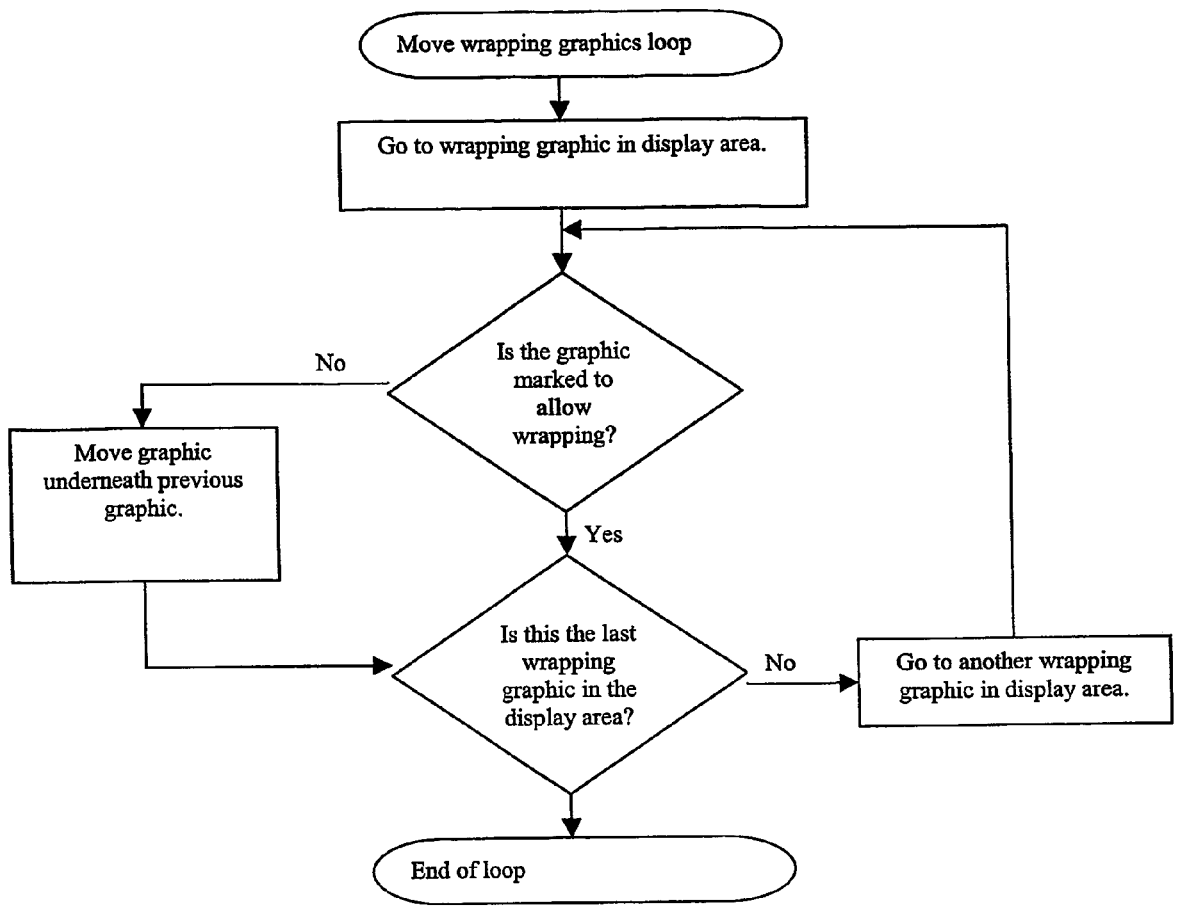
FIG. 3 is a flowchart of the graphics wrapping process from FIG. 2.
Figure 4:
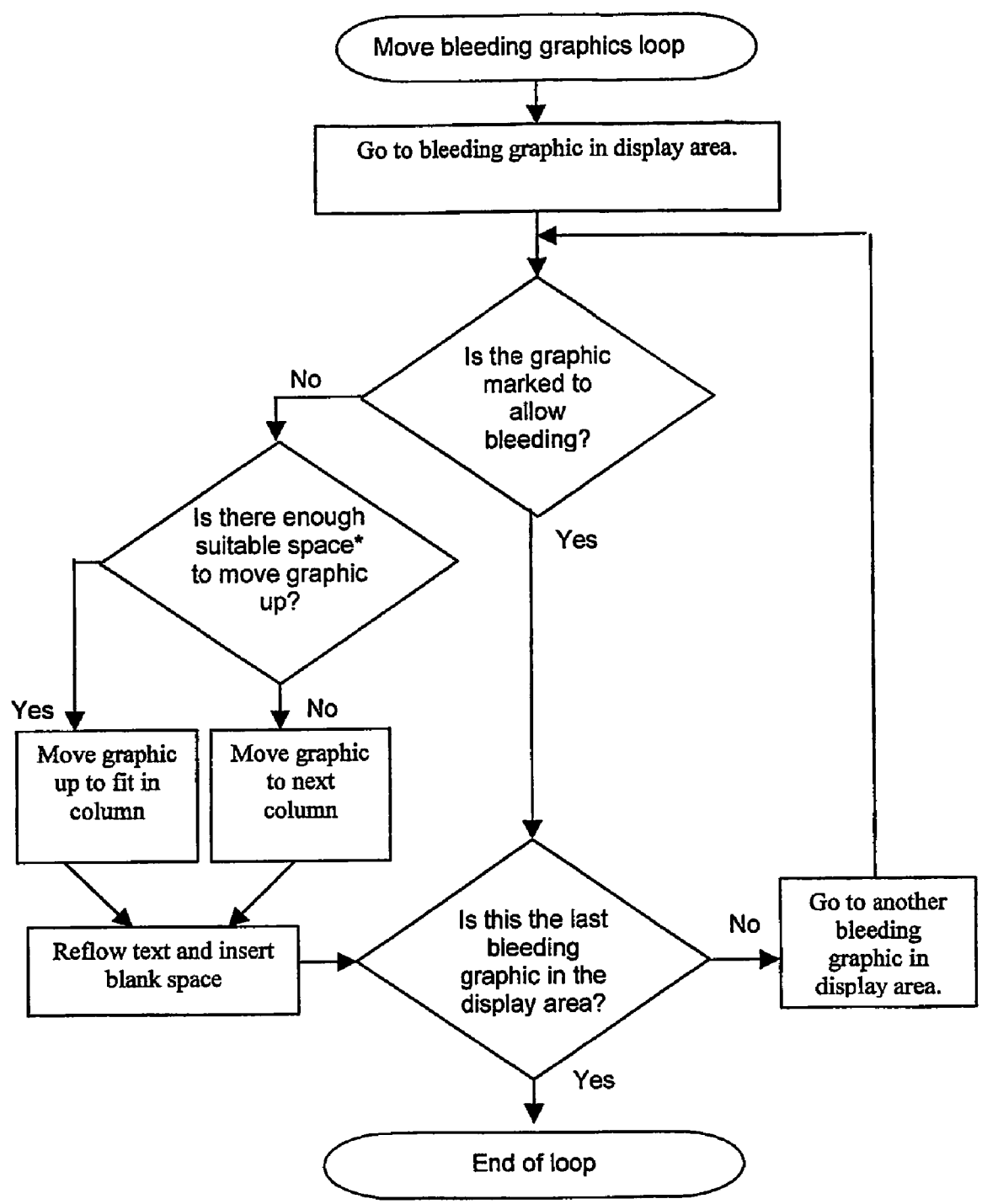
FIG. 4 is a flowchart of the graphics bleeding process from FIG. 2.

The rendering unit and formatting unit perform a number of steps that can be best thought of as a pagination process that is shown in FIGS. 1-3 and described in greater detail in the following steps:

Pagination Procedure

The following steps are suitably performed by the rendering unit:

1. Create a new location (such as a file-system directory) in cache with a name or identifier based on document's name, screen resolution, magnification or an indicator of the intended displayable columns and their sizes;

2. Copy document from publisher repository into newly created cache directory;
3. Check the document for publisher preferences
4. Open system's master rendering document;
5. Use current (end-user) display settings and publisher preferences to set basic frame structure.

The following steps are performed by the formatting unit:
6. Open the cached document for reformatting;
7. Scan for potentially hostile or problematic contributed code, such as embedded applications and macros; disabling where appropriate
8. Delete all hyperlinks from document for navigation encryption, replace with colored underlined text;
9. Remove empty paragraphs, adjust inter-paragraph spacing;
10. Compress or expand tab stops, indentations etc, optimizing document for specified column width and magnification;
11. Reduce all graphical elements larger than a column's width or height to fit except those marked-up as scrollable;
12. Adjust width of caption boxes;
13. Check for section break(s) on page, if so insert blank space to start content in next section in next column;
14. Unless marked-up to allow wrapping, detect if graphical elements on screen horizontally 'wrap' next to each other, moving them down so as to appear vertically separated down the document;
15. Check for graphical elements which bleed off the bottom of the display area and:
    a. If element is marked-up as 'un-movable' then do nothing, or
    b. If text above element is of the same attributes as the text next to and below it, move element up the page to fit it on the screen if possible, or
    c. Move the element to the next screen page or column, inserting blank space or moving any text after the shape into the preceding column if appropriate;
16. Record (optionally encrypting) top and bottom visible column boundaries in relation to the current area of the document being displayed (by the number of points from the top of the document for example) or a reference to the documents first and last currently visible characters (see FIG. 9);
17. Remove any previous blank space buffers;
18. Insert blank space 'buffer' after previously established last character or column bottom boundary position;
19. Move document up so blank space buffer is at top of screen-column;
20. Write progress to cache location for multi-user splash screen reports;
21. Repeat steps 13 to 20 over entire document;
22. Add more blank-space to the bottom of document;
23. Break document up into more manageable sub-document chunks if necessary;
24. Suitably add icons and controls to screen areas used for navigation, as provided by the rendering unit, according to the number of columns paginated in the document and the number of columns that will be simultaneously displayed on the screen;
25. Create default summary information from first paragraphs if it has not already been included by the content's creators;
26. Save the changes to the cached document and associated frame set and navigation documents A certain amount of set-up is required to capture user information if maximum advantage is to be obtained from the method. The information can be captured in a new session process according to the following steps:

New Session Process
1. Start session/Required start-up document name and location is passed to system;
2. Display full display area splash screen, turn off user interaction;
3. Obtain username and password if required, evaluate and grant access;
4. Lock end-user display, stopping all input;
5. Create end-user cache if one does not already exist;
6. Load settings from any previous settings or default settings such as:
    a. To-Do lists
    b. History lists
    c. Magnification levels
    d. Number of column preferences
    e. Searches
    f. Home page location
    g. Contents page location
    h. Optionally load the last used document
    i. Various other settings;
7. Create end user command structure based on available display area:
    j. Icon menus with words for larger screens
    k. Icon menus without words for smaller screens
    l. No icon menus (or a reduced set) for some very simple devices such as public kiosks or miniature handhelds, where navigation and commands might be implemented externally as buttons or joysticks on the device;
8. Open start-up document using Open Document Procedure.

Figure 8:
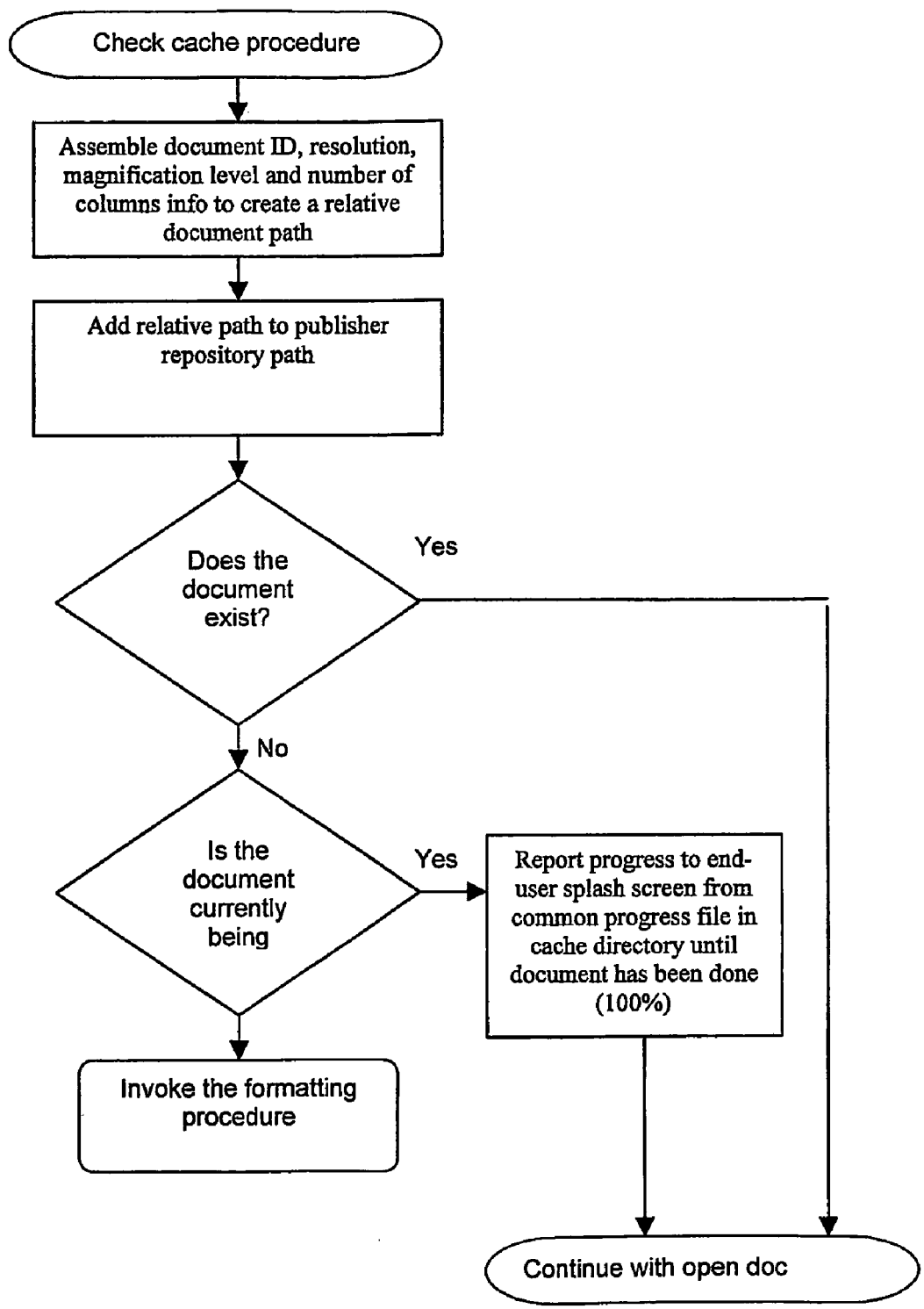
FIG. 8 shows how one of the invention's a display units interacts with one of its Cache units.

Open Document Procedure
1. User clicks on hyperlink or document to be open is supplied from other procedure;
2. Obtain username and password (if required);
3. Check management system for permission to open document (if required);
4. Check if document exists in Publisher's repository;
5. If document is not found, display error message or page;
6. Display full display area splash screen, turn off user interaction;
7. Close all currently closed documents;
8. Select navigation system according to in the following order of priority, as marked up in document or known by system from end-user input:
    a. Display area restrictions
        i. Ascertain or calculate maximum width and height to be used for columns in the display area
        ii. Establish the range of magnifications permitted in the display area
    b. Publisher compulsory preferences
        i. Scrolling only or scrolling with pagination
        ii. Magnification level
        iii. Number of columns
    c. End-user preferences
        i. Scrolling only or scrolling with pagination
        ii. Magnification level
        iii. Number of columns
    d. Publisher's default display preferences
        i. Magnification level
        ii. Number of columns;
9. Checks if file is cached (see FIG. 8), if not, checks if document is in the process of being paginated and waits or if not, invokes Pagination Procedure;

10. Determine filename of cached document appropriate for the above navigation system;
11. Checks if cached file is newer than published original, if not invokes Pagination Procedure before proceeding;
12. Optionally copies document into end-user specific cache;
13. Loads document into each column;
14. Determines appropriate position of content to be displayed in each column by:
    a. Programmatic control, as in the case of forward/back navigation from previous documents or
    b. Default first and second pages or
    c. Bookmark position specified by user or
    d. Bookmark position specified by hyperlink;
15. Decrypts position in document of required columns;
16. Moves (i.e. scrolls) document to populate columns with required content;
17. Insert additional information in document, such as automatic links to other content;
18. Load virtual sidebars with marked-up content;
19. Enable scroll buttons if any content exceeds on-screen column dimensions;
20. Update history list;
21. Update to-do list;
22. Update command structure (menu) options;
23. Remove full-screen splash screen and enable user control;
24. Inform management system of successful display;
25. Inform management system of display of monitored items on screen;
26. Start next document preloads if required.

The order of steps described may be changed or some steps may be omitted to optimize the system for particular uses. Where these processes occur in memory or behind splash screens, the terms 'visible' or 'displayed' are for explanative convenience only, referring to that part of a process which could be seen should an end-user be allowed to view it.

The command structure and navigation set up by the rendering unit may also be linked to end-user device hardware, such as page and arrow keys or a microphone (or associated speech recognition engine) for voice-activated navigation. It may also be accessed programmatically by other third-party applications.

At various times during rendering, formatting or display, all or parts of documents may be removed from video or program memory—'made invisible'—so as to speed up or otherwise optimize their manipulation by the system or end users.

Figure 5:
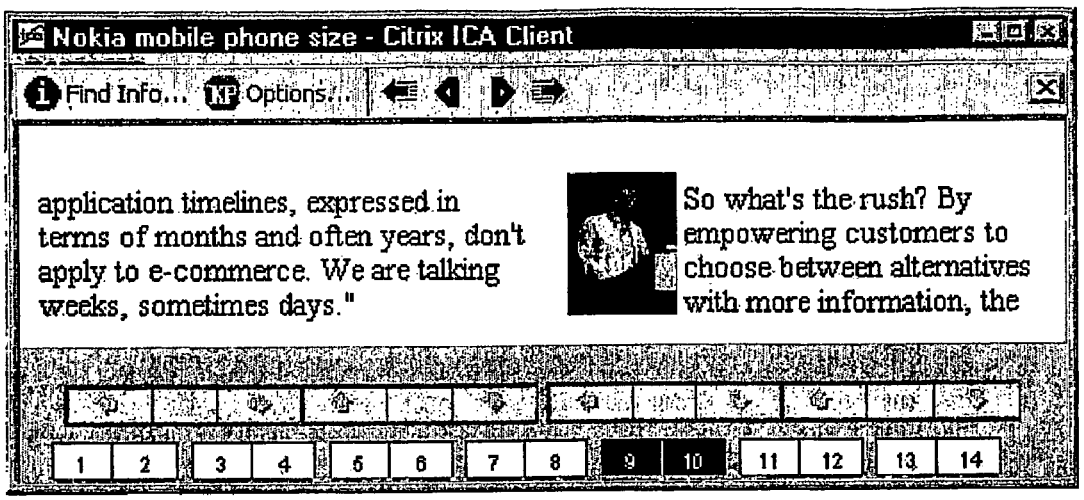
FIG. 5 displays a document formatted for a PDA display.
Figure 6:
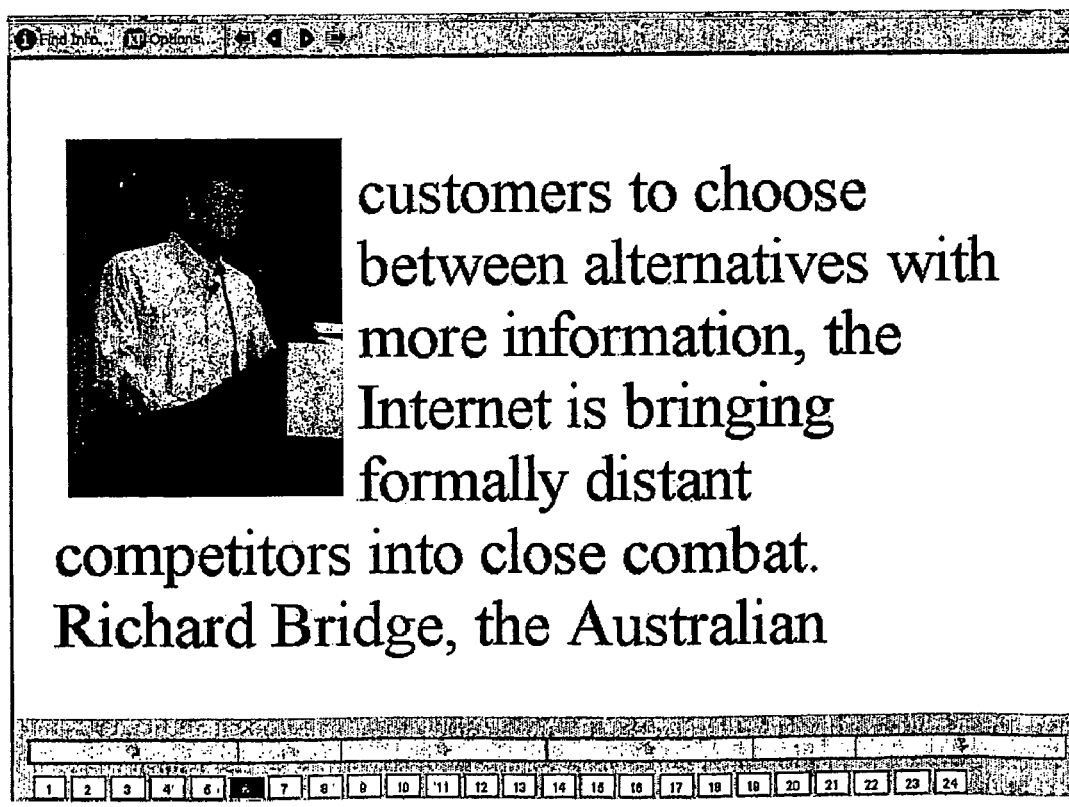
FIG. 6 shows the same document as FIG. 6 reformatted for a television monitor.
Figure 7:
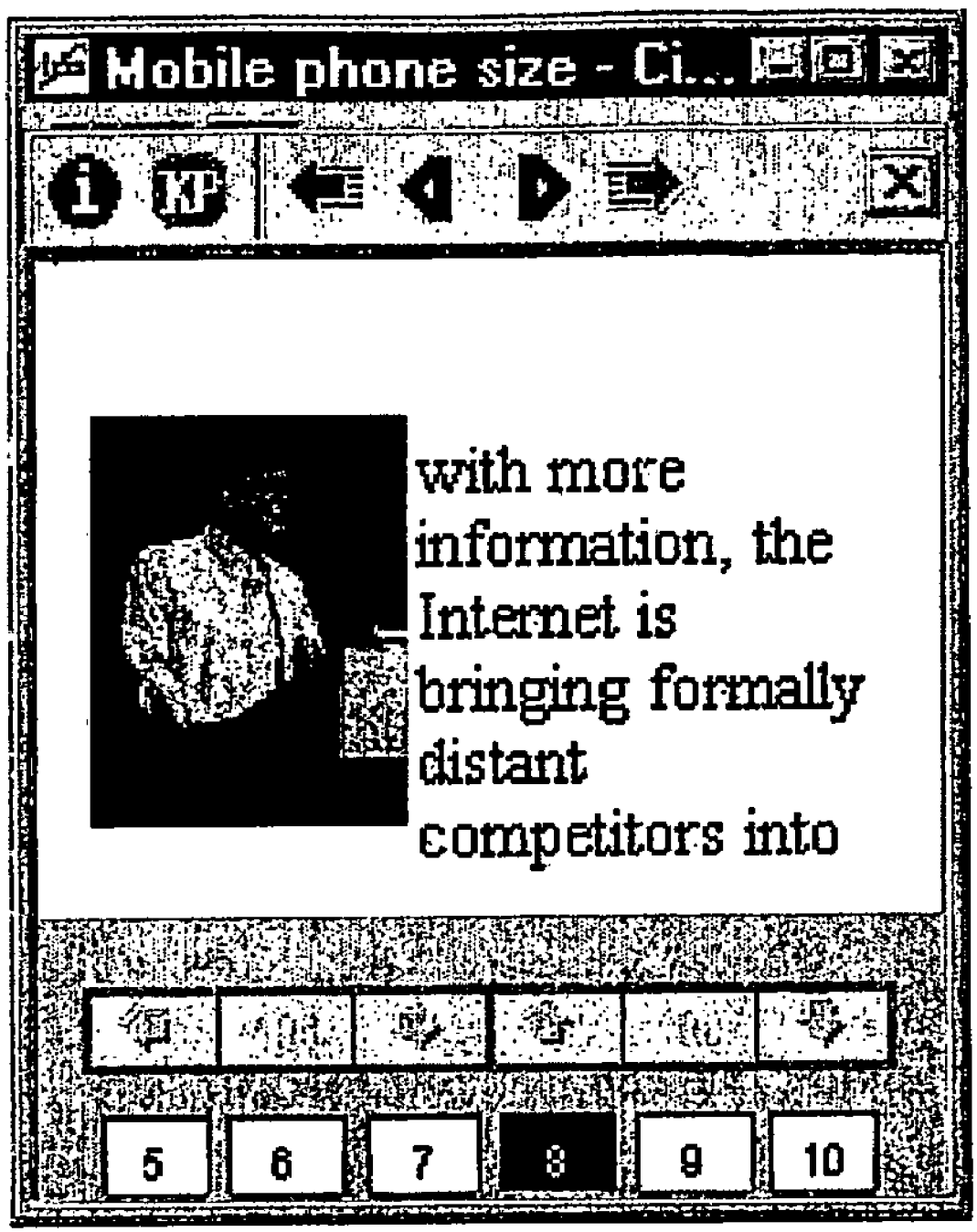
FIG. 7 shows the same document as FIG. 6 reformatted for a mobile phone display.

The outcome of the system and method can be seen clearly in the examples of FIGS. 5-7. A master document was produced by a stakeholder subsystem to contain a graphic element and a number of text blocks. In FIG. 5 the content is reformatted for display on a mobile device, such as personal digital assistant/communicator combination. The navigation elements described above are evident at the bottom and top of the display. The navigation elements include navigation arrows as well as page or column numbers.

FIG. 6 shows the same content reformatted for a television screen. It should be noted that the magnification is larger and repositioned with respect to a larger image. Similarly, in FIG. 7 the same content is reformatted for display on a mobile phone-sized screen.

The presentation subsystem may be used in a commercial publishing environment in the following manner:
1. Stakeholder subsystems provide information to the interface subsystems, allowing links to the presentation subsystems to be published in Web pages;
2. An end-user requests to see a document by clicking on a link;
3. The interface subsystems forward locational information to the management subsystems, such as IP address or locational information from an end-user device;
4. A logon session is created (such as via a secure Web page or remote display protocols or locally from the invention's own interface) to find out who the user is in relation to the publisher, which if successful, causes the management subsystem to create a unique session number for that users session with the presentation subsystem;
5. The logon session forwards locational information to the Management subsystem;
6. The display unit forwards locational information to the Management subsystems;
7. The display unit finds the document in the Cache unit. If the document is not in cache, the display unit obtains the document's location from a management sub-system, allowing it to draw on the publishers master document repository. The management subsystem evaluates the request, authorizing it according to the business models associated with the document; these business models may include invoking substitute content based on the provision of such locational information.
8. Once authorized by the management subsystem, the display unit seeks a document from the cache corresponding to the display area, user and publisher preferences;
9. If one can be found (the majority of cases), it is loaded and displayed for image transmission, if not, the rendering unit is engaged to determine an appropriate layout and navigation system and the reformatting unit then handles the content accordingly;
10. The caching or display unit may attempt to obtain a suitable document from another's Presentation subsystem's cache, rather than initiate fresh reformatting.
11. After being loaded from the cache, the document image is displayed via remote display protocols;
12. The display unit accepts navigation commands from the user;
13. The display unit monitors end-user activity in relation to time or session charges as controlled by the management subsystem;
14. The display unit monitors 'revenue content' such as advertising, informing the management subsystem of its exposure;
15. The display unit also provides account management tools and activity reports to end users;
16. The display unit also provides end-users integrated searching between sites, documents and the content within a document;
17. The display unit also provides histories of previously seen documents, favorites and 'to-do' lists of must-see documents;
18. From time to time, the caching unit may delete from itself infrequently used documents. Conversely, it may be pre-loaded with previously formatted documents in anticipation of heavy use. This may be implemented under Management system control according to the business models associated with a document.

The above scenario would not contain as many steps if the invention is used to display documents on an end-user's machine to their cell phone over the Internet. Organizations running the publishing system in-house may also require fewer steps. Depending upon the implementation, the order of steps may also vary. However in all cases, the unique four-stage architecture of the presentation subsystems remain the same. The Cache, display, formatting and rendering units may be deployed on different machines for load-balancing purposes.

It will be appreciated that the presentation subsystem, and in particular the display unit, is not limited to on-screen display. For example, content may be sent directly to a commercial printer for one-time hard copy printing, to a sound studio for one-time listening, or to a cinema for viewing. In all cases, a 'screen' also may be understood as the display area in which a document is to be imaged, such as within a box on a Web page. Also the term 'document' may also refer to other content, such as video or audio associated with document.

It will also be appreciated that the presentation system optimizes documents for document image transmission and display over computer networks. These optimizations include:

1. Suppressing screen updates during document reformatting with the judicious use of full-display area splash-screens;
2. Suppressing screen updates during document navigation using column-sized splash-screens;
3. Suppressing screen updates by reducing scrolling through pagination for available display areas. Where scrolling is required, the system mandates scrolling be done in steps rather than gradually. All this is achieved by moving content up or to the next column where possible, while still allowing individual elements to 'bleed' (a publishing term) off the base of the screen for scrolling at the same time, where size reduction or movement is inappropriate. Oversize pictures may also be reduced and enlarged by clicking on them. Thus on a single page some content may be moved, some content may be reduced, some content will fit, while some may be allowed to bleed for scrolling. Thus text will hardly ever need to be scrolled whereas irreducible content (auto-detected or marked up as such) such as maps which are bigger than the screen will always need to be scrolled to get the full picture. However where a long skinny strip map appears next to text, the text will be paginated to fit on the screen while the strip map is 'bled off' for scrolling. (This is unique to an automated system.) Thus end users might never need to scroll to read the main body of text and not be interested enough in the oversized material to bother scrolling (See FIG. 9);
4. Suppressing screen refreshes by filtering end-user commands likely to have been caused in error, such as over-scrolling due to response time delays over the network;
5. Suppressing screen updates by using 'direct' navigation techniques, which avoid flicking through columnular screen pages to see the desired text, such as between the 'found' words within a document resulting from a search. This reduces the amount of screen refreshes before the desired portion of text is found and makes the end-user experience much quicker;
6. Provision of direct page navigation icons, Go To Page commands and bookmarks;
7. Provision of 'next found' and 'previous found' navigation between documents reduces having to redisplay search results documents to go to the next result;
8. Provision of 'Next' and 'Previous' screen navigation to compliment the more traditional 'forward' and 'back' navigation. This has the effect of coordinating inter-document with screen page navigation within a document, reducing the need to start viewing a document from its beginning. The four-button approach allows the system to automatically return users conveniently to the exact screen-page in a document where they were viewing it last. So Forward and Back buttons replay where a user has been, while Next and Previous buttons allow screen page navigation to deviate from the previously established paths;

The presentation system also provides particular advantage for viewing documents in small windows, such as those allocated by an information portal in a typical Web page containing other information. In this scenario a number of deployment options are possible, including:

1. The entire presentation system can run on the end-user's computer platform as their personal reformatting service. This makes sense when the information within a document has been customized for individual use, requiring reformatting on an individual basis;
2. Being processor intensive, reformatting may be done on a separate server, while display and caching of an individual's documents remains on their machine or on a dedicated display server;
3. The display remains on the end-user's machine, but to eliminate the same reformatting of a document many times, caching is centralized on a fileserver. To further reduce processing, if a document is not in the cache and is presently being reformatted for inclusion in the cache, further requests will use the same output without starting a duplicate reformatting process;
4. The entire system can be run on a server, displaying on end-user display areas via remote display protocols, being a convenient all-in-one implementation for smaller organizational units;
5. The display unit can be run on separate servers to the other units within the presentation system. This allows computing resources to be allocated on the basis of need, with the faster processors within an organization being dedicated to reformatting.

Another use of the presentation system is to browse documents in a similar manner to the way in which web pages are browsed, only with better end-user control. This can be done without the need to convert the documents to HTML, thus promoting information reusability. The presentation system provides the following features to support this application:

1. Auto-contents page generation, allowing the flagging of documents to be placed in a to-do list, plus instant summary detail information;
2. Auto-search page generation, listing results in the directory hierarchies in which they were found, thus preserving their context in relation to other documents and topics. Such searches can be added or subtracted to each other, as well as having the to-do and summary features contents pages. Searches can be preserved for later viewing or updating;
3. Automatic document usage tracking, allowing administrators to know exactly which documents were viewed by whom and for how long. This is able to use standard network logon information and standard documents, eliminating the need for running a separate management system or membership services.

The presentation system can also be deployed in an ASP scenario. In this scenario, end-users send their documents to a service provider, to be custom formatted by the system to an appropriate screen-size and magnification. Typically, the service provider may also cache the document. The results are then viewed on display servers via remote display protocols or on the system's display units deployed on local machines. Features supporting software as a service include:

1. Document formatting and cache usage tracking—The system allows monitors how documents are drawn from the cache, and provides details of document usage such as usernames, IP addresses, times, format popularity and the like in various logs or to a messaging system. This allows the system operators to better manage and charge for their services.

2. Multi-user support—The system uses three kinds of caches. A general multi resolution & magnification cache is used to store previously formatted content. This may also include temporary storage areas to be used in the process of document formatting. Copies of documents may be placed in an end-user's or the display units current session cache to enable their personalized use while avoiding contention issues with other users. Finally, a user-cache stores user-defined content that needs to span end-user sessions, such as search results or personal billing and usage reports. In many cases, these may also be stored in concentrated formats to be reconstituted on demand by the presentation subsystems for user display purposes. In this way, the bandwidth and disk storage space requirements needed to support thousands or even millions of centralized user caches can be minimized.

3. Enhanced document security—Traditionally documents can be password protected and sometimes encrypted to avoid unauthorised use. However, once the document is in a computer's memory it is usually fully exposed, allowing it to be easily copied by hackers. The current invention limits the usefulness of documents in memory for unauthorised use by encrypting all the references and document structures used by the navigation features described above. These are stored separately and added back into the document as required and decrypted only as they are used; meaning a full version of the content is never loaded entirely into memory at any point in time. The result is a formatted document that is practically unnavigable by any other system with very economical use of processing power, while providing better protection from hackers. This is particularly so in the case of commercial online publishing, where the content is being displayed for image transmission by a closed system at an Application Service Provider, making the above measure precautionary rather than a primary means of defense.

4. Anti-denial of service mechanisms—Because the system monitors the use of documents by users, it is also able to search for signs of suspicious activity, such as excessive use of the invention's navigation features or repeated failed logins or repeated 'non-revenue producing sessions'.

5. Management system interface—Part of the system's resistance to attack and maintenance functions for ongoing availability and reliability are a range or self-monitoring functions. The invention also monitors itself for unusual conditions or behavior and may forcefully lock the user interface when appropriate. Access to the rendering, reformatting, cache and display units may also be restricted, requiring authorisation from an external management system before processing can occur. Based on how it is being used, the system may also automatically or under management system control take remedial actions such as sending information messages, shutting down all or the affected parts of itself, receiving instructions form a management system, disconnecting from a user or restarting.

The display unit of the system allows the running of applications embedded within documents. These may include image boxes where the images of applications sent via remote display protocols are viewed. Thus an instance of the system can be embedded within itself if so desired. Applications contained within the system have tremendous reach, with their accompanying information being suitable for display within a multitude of devices and usage scenarios. Such applications may also be launched in separate windows via a hyperlink or button. The system's application support features include:

1. Embedded applications—Embedded applications can be monitored by the system, sending their time (on screen or running times) or CPU usage details to a log or messaging system. Additionally, any piece of content can be marked up for such monitoring, including pictures or text.

2. Contributed code—It is common for people to create their own Web sites, launching them unsupervised with the ISP. But online applications are orders of magnitude more expensive to create and maintain. The system addresses this problem by allowing macros to be contributed, automatically scanning source code for potentially harmful algorithms or system calls. This code may then be executed in an interpreted environment or compiled into an 'authorised' application. Thus the system supports the execution of publicly contributed code, without the need for human supervision or risk of compromising the system.

3. Applications may also be launched in separate windows via a hyperlink or button, with their usage details also tracked by the display unit. These could be run in an execution environment outside of the system, optionally giving the externally linked program a unique name, tracking its operation using the operating system's process monitoring interfaces.

4. Content pre-loading—In an application environment, it is often easy to predict a user's next move. Therefore to speed up interaction, particularly where custom formatting may be required before display, the pre-loading of documents is desirable. The system may support this with third party application programmer interfaces, end user commands or its own predictive algorithms.

The system can also be used as an advanced document viewer, making the reading experience more aesthetic by presenting material in columns and minimizing scrolling. This is of particular use in making long documents more viewable on-screen, which would otherwise normally be printed. The invention's desktop viewing support features include:

1. Caption resizing—Caption boxes (sometimes called balloons) accompanying pictures must sometimes be resized to fit on small screens. However this may reduce the size of the text until it becomes unreadable. Instead the system resizes the box in which the caption appears, extending it downwards until all the text becomes visible. Therefore in some cases reading the text in cases will require the entire document to be scrolled. In order to avoid this, caption boxes may be optionally extended downward but only to the base of the viewing area, with scroll bars then being provided within the caption box to view the remaining caption text not visible on the screen.

2. Blank space formatting reduction & expansion—The reformatting of documents, particularly for small screen devices, often requires a reduction of blank space. If a document is formatted with tab stops or indentations, when displayed on small screens these can potentially fill most of the viewing area with blank space, causing text to wrap after only a few words. However often such indentations should not be removed, as they indicate the relative importance of one piece of content with the next.

On the other hand, the same document viewed on a large screen, particularly with negative magnification, needs blank space for readability. Therefore the system is able to reduce the amount of blank space in some situations, while increasing it in others, providing the best readability for the display area provided. The system does this automatically or using publisher preferences using a number of methods, including adjusting margins, indentations and tab stops.

3. Blank space creation—In some situations it is desirable for the system to pad a document with additional blank space. For example, a large picture at the end of a document may be better displayed fully in the next column than force the user to scroll. In this situation the text at the end of the document would finish before the end of the column, requiring padding with enough blank space afterward to push the picture to the next column. (Blank space has to be inserted into computer-generated content, which is unlike a paper document, where blank space is present before printing occurs.)

4. Iconic command structures—A desktop PC environment will probably have enough room to display a command selection system, such as menus or hyperlinks, which contain words. However this is not usually the case in smaller viewing areas, such as within a box in a Web portal or on a mobile device. Desktop users should not be forced to learn a new interface because screen space precludes the efficient use of wordy commands. To bridge the interface consistency gap between small and large display areas, the system uses icons in as many command structures as possible, automatically presenting only the icons on smaller display areas. The function of these commands can always be accessible via mouse-over tool-tips, however the icon-only representation of commands means identical command structures can operate on both large and small viewing areas, minimizing the learning curve to operate the invention over different viewing environments.

5. Watchword navigation—A user or content creator may create a list of words or phrases to be searched upon. These are automatically hyper-linked to the search document to a matching phrase's occurrence in documents.

6. Document splitting—The longer the document and the smaller the display size, the longer reformatting takes to occur. Additionally, the larger the document, the more system resources such as memory are required to display it. Therefore it makes sense for the system to break longer documents into smaller chunks for quicker and easier handling. This is done by using the natural breaks in a document created by pagination into screen-columns. This automatic breaking up and presentation of documents as an unbroken whole is transparent to end users, but helps speed up document initialisation times.

7. Virtual sidebars—Magazines often contain supplementary information in sidebars, however these don't translate easily into readable documents on screen. The problem is further compounded in smaller display areas, which have barely enough space for the main body of content to be presented. The answer is to use pop-out sidebars, which are actually another area of the same document presented in a window which slides out from the edge of the screen, sliding back again when no longer required. Optionally being a part of the main document, virtual sidebar content may also be screen paginated. Content can also be linked into virtual sidebars, effectively creating pre-loaded hyperlinks for greater speed and efficiency, only also with greater accessibility.

8. Word processor companion—Perhaps the best place for a desktop implementation is within or connected with a word processor. After creating a document, often it is best to proof read it on a printer. By paginating the document into a clearer, more readable form, more proofing can be done using the same application a document was created in, simply by selecting a 'Screen-Page' item in the View menu. This saves time waiting for print outs as well as printing and network bandwidth costs associated with printing in large corporations.

In all cases, the term 'picture' may refer to any graphic element or embedded application within a document. Throughout the specification the aim has been to describe embodiments of the invention without limiting the invention to any specific combination of alternate features.

The invention claimed is:

1. A document presentation system comprising:
   a rendering unit which determines content layout and navigation suitable for both small and large display areas of a display device by analysing publisher or end-user preferences or device characteristics in order to render the content layout and navigation in dimensions or magnification which are a near match to or according to the end-user or publisher preferences or device characteristics;
   a formatting unit that resizes and rearranges content according to the content layout and navigation determined by the rendering unit by measuring and manipulating the content, said manipulating including at least one of blank space reduction, blank space insertion, text condensing, margin adjustment, and tab stop adjustment;
   a display unit that presents content to the end-user and responds to end-user interaction; and
   a cache unit that stores reformatted content for display by the display unit;
   wherein the content resizing and rearranging includes at least one of identifying wrapping graphic elements and repositioning said graphic elements to avoid wrapping, identifying section breaks and inserting blank space to push content to a next column, and identifying bleeding graphic elements and repositioning said graphic elements to avoid bleeding; and
   wherein the said formatting unit may optionally satisfy at least one of document originator preferences or content mark up.

2. The document presentation system of claim 1 wherein the rendering unit examines the dimensions of the available viewing area to determine a suitable document layout and navigation system.

3. The document presentation system of claim 2, where a basic layout of columns is used to measure content for dividing documents into smaller sections for easier on-screen viewing.

4. The document presentation system of claim 2, where a basic layout of columns is used to manipulate content for dividing documents into smaller sections for easier on-screen viewing.

5. The document presentation system of claim 2 implemented as a word processor companion, with a formatting unit screen paginating documents into columns.

6. The document presentation system of claim 1 wherein the rendering unit determines content layout and navigation according to set increments of size or magnification.

7. The document presentation system of claim 1 wherein the rendering unit establishes device characteristics such as the presence or absence of external buttons joysticks or speech recognition, altering the on-screen navigational features accordingly.

8. The document presentation system of claim 1 wherein the formatting unit performs said content manipulation including all of blank space reduction, blank space insertion, text condensing, margin adjustment, and tab stop adjustment.

9. The document presentation system of claim 8, where a basic layout of columns is used to measure content for dividing documents into smaller sections for easier on-screen viewing.

10. The document presentation system of claim 8, where a basic layout of columns is used to manipulate content for dividing documents into smaller sections for easier on-screen viewing.

11. The document presentation system of claim 8, implemented as a word processor companion, with a formatting unit screen paginating documents into columns.

12. The document presentation system of claim 1 wherein the formatting unit divides content into sections for easier on-screen viewing.

13. The document presentation system of claim 1 wherein the formatting unit creates progress reports published to multiple end-user displays.

14. The document presentation system of claim 1 wherein the formatting unit performs document splitting understood by the display unit.

15. The document presentation system of claim 14, where a basic layout of columns is used to measure content for dividing documents into smaller sections for easier on-screen viewing.

16. The document presentation system of claim 14, where a basic layout of columns is used to manipulate content for dividing documents into smaller sections for easier on-screen viewing.

17. The document presentation system of claim 14 implemented as a word processor companion, with a formatting unit screen paginating documents into columns.

18. The document presentation system of claim 1 wherein the display unit incorporates processes for detecting system misuse, such as attempted unauthorized access or denial of service through repeated use.

19. The document presentation system of claim 1 wherein the display unit is optimized for viewing or control via remote display protocols with filtering of end-user commands or requests likely to have been made in error due to network delays.

20. The document presentation system of claim 19, where a basic layout of columns is used to measure content for dividing documents into smaller sections for easier on-screen viewing.

21. The document presentation system of claim 19, where a basic layout of columns is used to manipulate content for dividing documents into smaller sections for easier on-screen viewing.

22. The document presentation system of claim 19 implemented as a word processor companion, with a formatting unit screen paginating documents into columns.

23. The document presentation system of claim 1 wherein the formatting unit converts content to a frame structure.

24. The document presentation system of claim 1 further comprising means for locating and loading a printable version of displayed content for printing or for sending a printable version to a printer or for instructing an other application to do so on behalf of an end user.

25. The document presentation system of claim 1, where a basic layout of columns is used to measure content for dividing documents into smaller sections for easier on-screen Viewing.

26. The document presentation system claim 1, where a basic layout of columns is used to manipulate content for dividing documents into smaller sections for easier on-screen viewing.

27. The document presentation system of claim 1 implemented as a word processor companion, with the formatting unit screen paginating documents into columns.

28. A document presentation system comprising:
   a rendering unit which determines content layout and navigation suitable for both small and large display areas by analysing end-user or publisher preferences or device characteristics;
   a formatting unit that resizes and rearranges content according to the content layout and navigation determined by the rendering unit, wherein the rendering unit may optionally satisfy at least one of document originator preferences or content mark up;
   a display unit that presents content to an end-user and responds to end-user interaction;
   a cache unit that stores reformatted content for display by the display unit; and
   wherein the said display unit is responsive to pre-defined copy-zones, wherein users are otherwise prohibited from selecting and copying content to their clipboard.

29. The document presentation system of claim 28, where a basic layout of columns is used to measure content for dividing documents into smaller sections for easier on-screen viewing.

30. The document presentation system of claim 28, where a basic layout of columns is used to measure content for dividing documents into smaller sections for easier on-screen viewing.

31. The document presentation system of claim 28, where a basic layout of columns is used to manipulate content for dividing documents into smaller sections for easier on-screen viewing.

32. The document presentation system of claim 28 implemented as a word processor companion, with a formatting unit screen paginating documents into columns.

33. A method of reformatting content for display on a display device including the steps of:
   retrieving content from a repository;
   determining characteristics of a display device that is to display the content including the area available for display of the content and also any associated control structures on the display;
   rendering one or more content areas and any associated control structures to suit the display characteristics;
   reformatting content for display of the content in the said content areas by measuring and manipulating the content, said manipulating including at least one of blank space reduction, blank space insertion, text condensing, margin adjustment, and tab stop adjustment, said reformatting including resizing and rearranging;
   whereby the content resizing and rearranging includes at least one of identifying wrapping graphic elements and repositioning said graphic elements to avoid wrapping, identifying section breaks and inserting blank space to push content to a next column, and identifying bleeding graphic elements and repositioning said graphic elements to avoid bleeding; and
   whereby the said rendering and reformatting is suitable for smaller and larger screens as the case may be.

34. The method of claim 33 whereby the content resizing and rearranging includes all the steps of:
- identifying wrapping graphic elements and repositioning said graphic elements to avoid wrapping;
- identifying section breaks and inserting blank space to push content to a next column or screen page; and
- identifying bleeding graphic elements and repositioning said graphic elements to avoid bleeding.

35. The method of claim 33 further including the step of encrypting information pertaining to end-user interactions.

36. The method of claim 33 further including the step of checking content for graphical elements that bleed off the bottom of a display area of the display device and:
- a. If element is marked-up as 'un-movable' then do nothing, or
- b. If text above element is of the same attributes as the text next to and below it, move element up the page to fit it on the screen if possible, or
- c. Move the element to the next screen page or column, inserting blank space or moving any text after the shape into the preceding column if appropriate.

37. The method of claim 33 further including the step of selecting a navigation system for display of content according to one or more of the following:
- a. Display area restrictions;
- b. Publisher compulsory preferences;
- c. End-user preferences; and
- d. Publisher's default display preferences.

38. The method of claim 37, where reformatting includes paginating documents into screen-columns.

39. The method of claim 38, where content is copied into a an end user specific cache for populating columns with content.

40. The method of claim 39, where reformatting is activated to provide a document at a different magnification.

41. The method of claim 38, where reformatting is activated to provide a document at a different magnification.

42. The method of claim 33 further including the step of document splitting.

43. The method of claim 42, where reformatting includes paginating documents into screen-columns.

44. The method of claim 43, where content is copied into a an end user specific cache for populating columns with content.

45. The method of claim 44, where reformatting is activated to provide a document at a different magnification.

46. The method of claim 43, where reformatting is activated to provide a document at a different magnification.

47. The method of claim 33 further including the step of outputting content to a repository storing information according to the specific display dimensions or magnification levels to which the content has been formatted.

48. The method of claim 33, where reformatting includes paginating documents into screen-columns.

49. The method of claim 48, where content is copied into a an end user or current session cache for populating columns with content.

50. The method of claim 49, where reformatting is activated to provide a document at a different magnification.

51. The method of claim 48, where reformatting is activated to provide a document at a different magnification.

52. A document presentation system comprising:
- one or more rendering unit(s) that determine the boundaries into which content is to be reformatted according to display area restrictions, in order to render the content layout and navigation in dimensions or magnification which are a near match to or according to publisher or end-user preferences or device characteristics;
- one or more formatting units for:
  - resizing and rearranging content by measuring and manipulating according to a layout of one or more-columns, said manipulating including at least one of blank space reduction, blank space insertion, text condensing, margin adjustment, and tab stop adjustment, and said manipulation also reducing one or more graphical elements if larger than a column's width;
  - dividing documents into smaller sections for easier on-screen viewing; and
  - moving elements into the next screen page or column and appropriately moving text after said elements into the previous column and/or inserting blank space therein;
- a display unit that presents content to an end-user and responds to end-user interaction including column and/or screen-page document navigational commands;
- a cache unit where content is copied into a an end-user and/or current session cache for populating said one or more columns with content;
- wherein the said formatting unit may optionally satisfy at least one of document originator preferences or content mark up.

53. The system of claim of 52 with the formatting unit grouping graphical elements to maintain their relative position.

54. The system of claim 52 interfacing a management system accepting logon information for determining access to documents.

55. The system of claim 52 with monitoring of any of time or session charges or content revenue monitoring such as advertising or content usage exposures.

56. The system of claim 52 with rendering unit(s) respecting originator preference(s) for document display within a word processor as traditionally scrolling content.

* * * * *